United States Patent Office 2,823,949
Patented Feb. 18, 1958

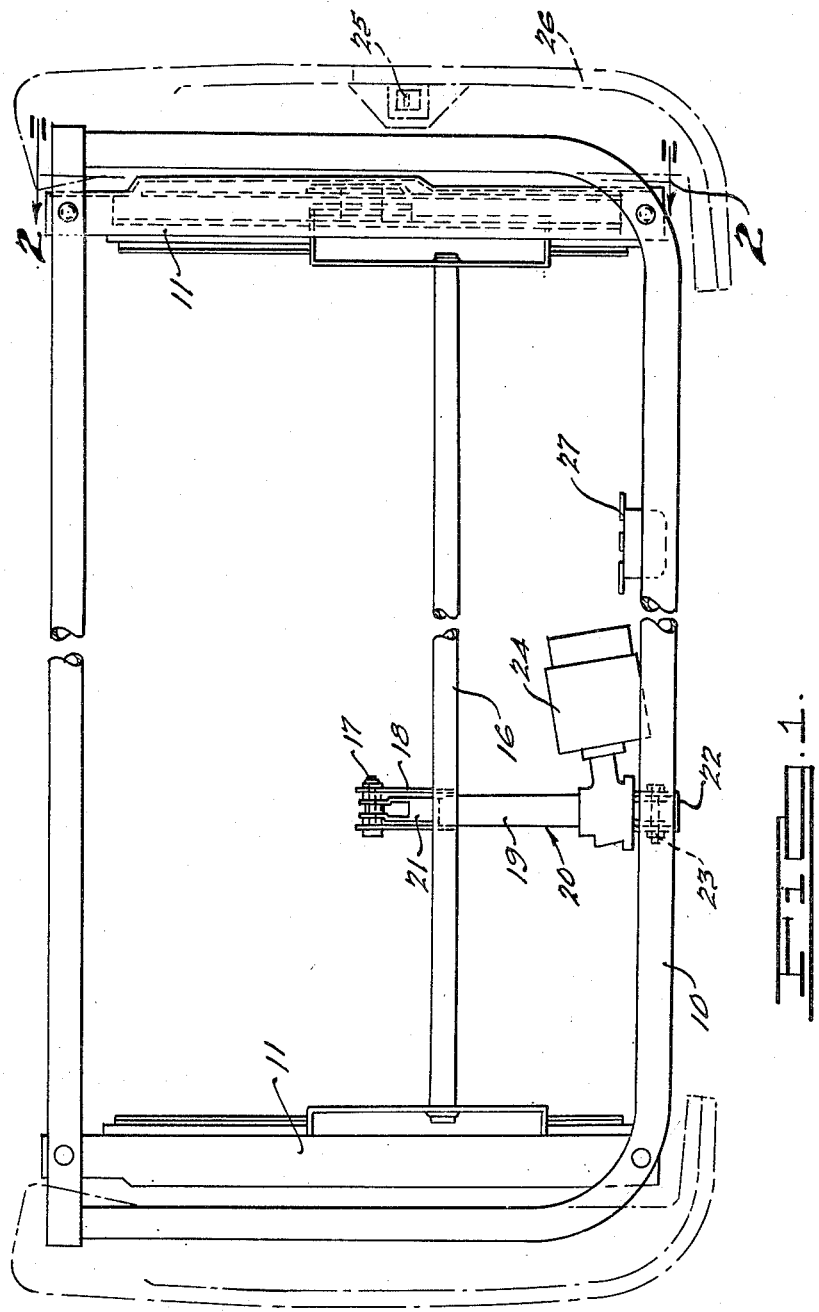

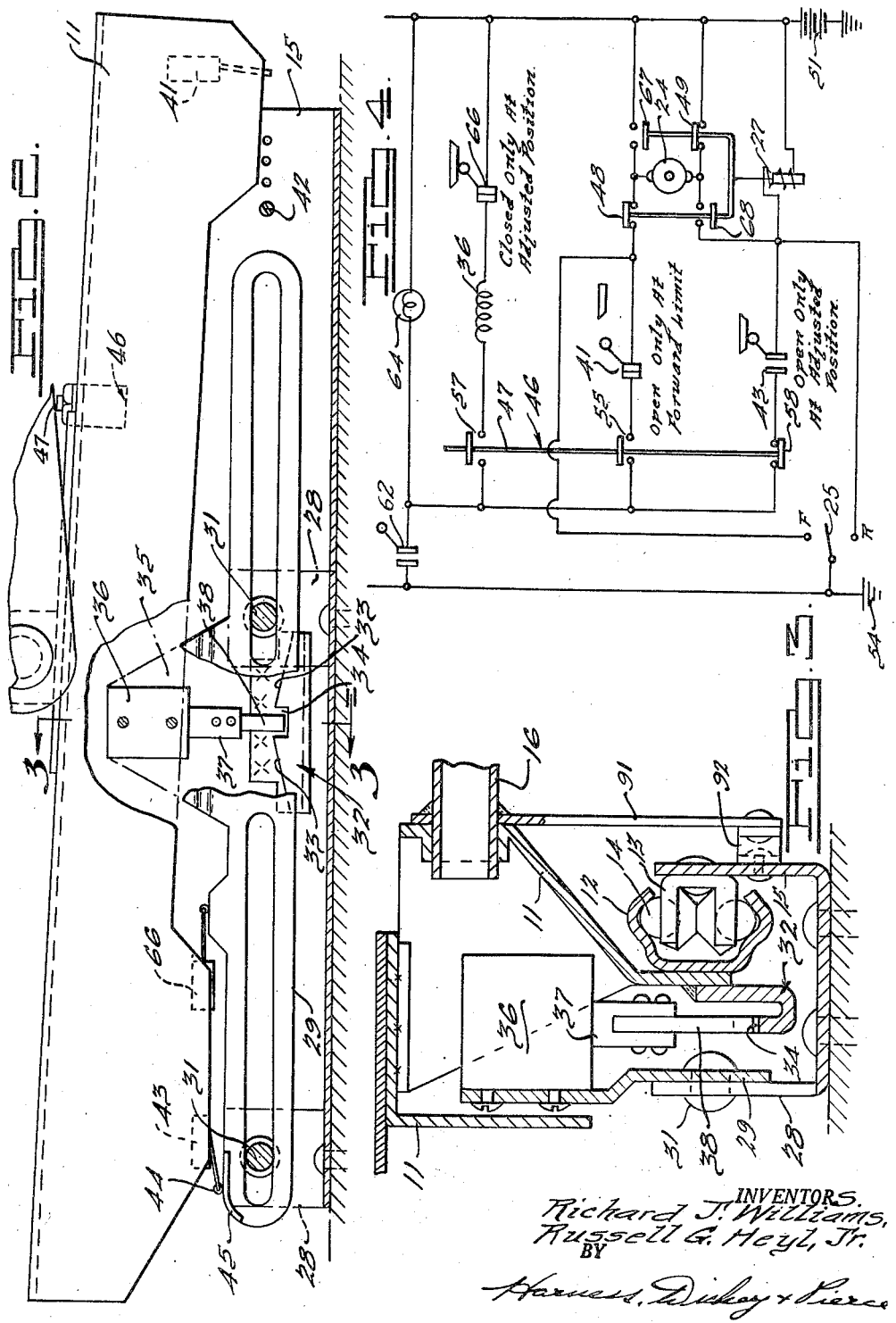

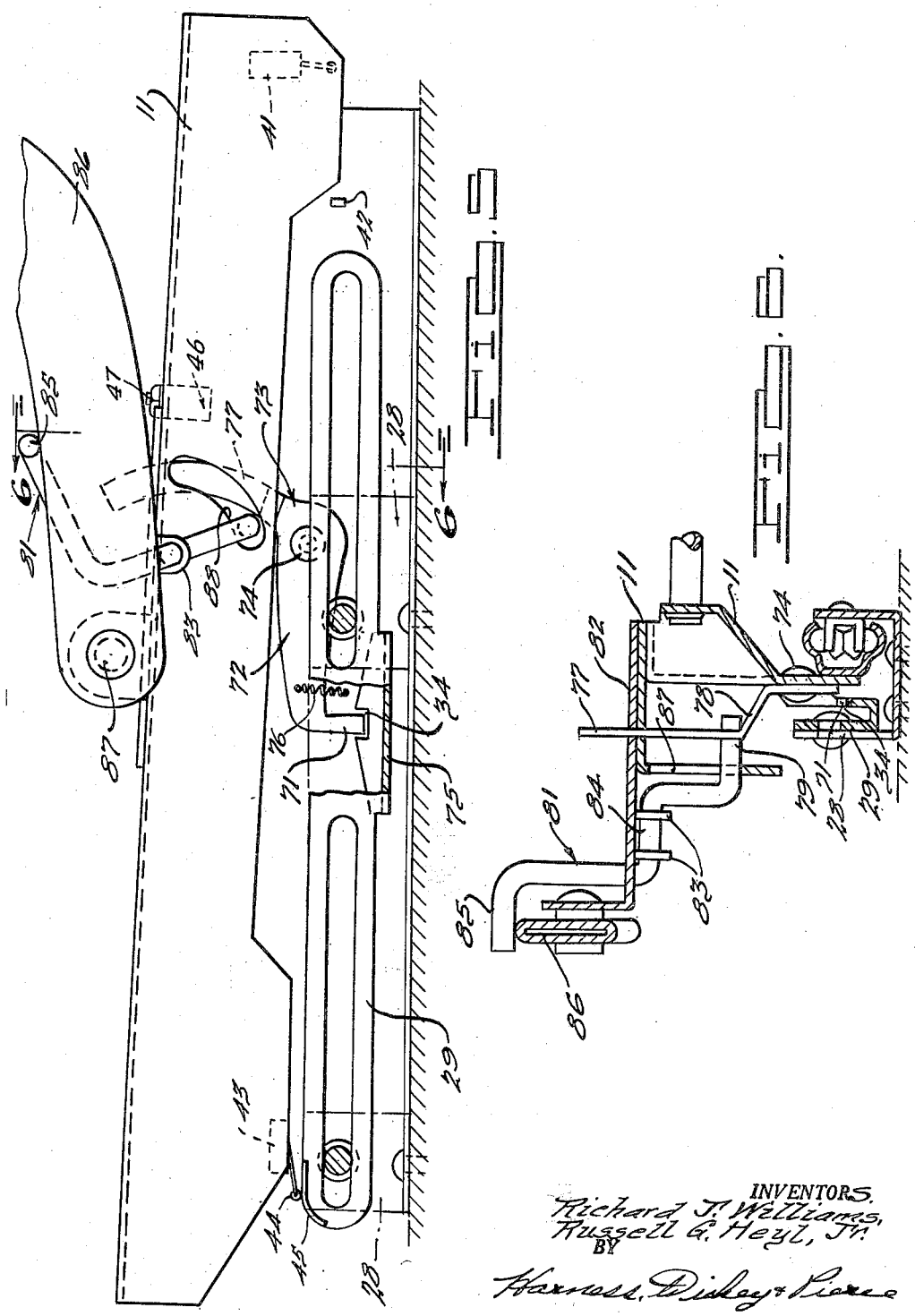

2,823,949

ADJUSTING MEANS FOR THE FRONT SEAT OF AN AUTOMOTIVE VEHICLE

Richard J. Williams and Russell G. Heyl, Jr., Birmingham, Mich., assignors to American Metal Products Company, Detroit, Mich., a corporation of Michigan Application December 21, 1953, Serial No. 399,404

12 Claims. (Cl. 296—65)

This invention relates to seat constructions for automotive vehicles, and particularly to a pivoted back on a seat which causes the seat to move forwardly when the back is tilted forwardly.

Difficulty is experienced by a passenger of an automobile when attempting to gain entrance to the rear seating area of the body, especially when a tall driver is operating the vehicle with the front seat moved to its rearmost position.

The present invention pertains to a motor driven mechanism by which the seat is adjusted forwardly and rearwardly automatically when entrance to the rear seating area is attempted. An electric circuit is provided in the normally operating circuit of the driving motor, interconnected with a switch actuated by the seat back which, when the seat back is tilted forwardly, completes a circuit to the motor which moves the seat forwardly. When the seat back is moved backwardly to its initial position, the circuit to the motor is reversed and the seat is returned to its rearward adjusted position. To accomplish this, a slide bar is mounted on the base of the seat track and is adjusted therealong as the seat is moved forwardly or rearwardly to a desired position. The slide bar has a switch operating finger thereon which is adjusted therewith so that upon the return of the seat from advanced position the seat will be stopped at its adjusted position.

Accordingly, the main objects of the invention are: to provide a device by which a seat is moved forwardly when the seat back is tilted forwardly for increasing the space between the rear pillar of the door opening and the front seat; to provide a slide bar which is carried by the seat when moved to adjusted position which is unlatched when the seat back is tilted forwardly so that upon the return of the seat it will stop at the point of prior adjustment; to provide a motor driven seat with a circuit interconnected with the tiltable backs so that when one of the backs is tilted forwardly the motor for moving the seat forwardly is energized, and upon the return of the back to its initial position the motor is reversed for returning the seat to its rearward position, and, in general, to provide a seat which is movable forwardly when the back is tilted to provide more room for entrance to the rear seating area, which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a plan view of a seat frame of conventional type having motor means which moves the frame back and forth when the back is tilted, embodying features of the present invention;

Fig. 2 is an enlarged sectional view of the structure illustrated in Fig. 1, taken on the line 2—2 thereof;

Fig. 3 is an enlarged sectional view of the structure illustrated in Fig. 2, taken on the line 3—3 thereof;

Fig. 4 is a diagrammatical view of the circuit employed in the structure illustrated in Figs. 1, 2 and 3;

Fig. 5 is a view of structure, similar to that illustrated in Fig. 2, showing a further form of the invention, and Fig. 6 is a sectional view of the structure illustrated in Fig. 5, taken on the line 6—6 thereof.

Referring to Figs. 1 to 4, a seat frame 10, upon which a seat cushion is mounted, is supported on brackets 11. Each bracket 11 is secured to a longitudinally movable track element 12 which extends over a track element 13 and is connected thereto by a plurality of balls 14. The track element 13 is mounted upon an angle-shaped floor-engaging bracket 15. A transversely disposed torsion bar 16 is pivoted to the brackets 11 and has a fixed arm 91 pivoted to a pivoted link 92 for rigidly interconnecting the brackets at opposite sides of the seat for retaining the seat parallel to all of its adjusted positions. A motor driven jack 20 has the end of the extensible portion 19 secured by a bolt 17 to a bracket 18 attached to the floor of the body. The body portion 21 of the jack has its forward end pivoted to a downwardly extending arm 22 on the frame 10 by a bolt 23.

When the motor 24 is operated in either clockwise or counterclockwise direction, the frame is moved forwardly or rearwardly, as the case may be. A switch 25 on the side of the seat trim panel 26 operates through a relay 27 for energizing the motor 24. When the button of the switch 25 is moved forwardly, the motor is energized to adjust the frame forwardly and when the button of the switch 25 is moved rearwardly, the motor is reversed to move the frame rearwardly. This construction is illustrated, described and claimed in the copending application of R. J. Williams et al., Serial No. 302,044, filed August 1, 1952, and assigned to the assignee of the present invention. In the construction described in the copending application, the frame may be raised and lowered relative to the track, in addition to its adjustment forwardly and rearwardly. It will be seen, therefore, that the present mechanism of moving the seat forwardly when the back is tilted forwardly, and rearwardly when the back is returned to its initial position, may be applied not only to the seat which may be adjusted forwardly and rearwardly but to one which additionally may be adjusted vertically.

To the base supporting element 15 a pair of upright flanges 28 is provided to which a slide bar 29 is secured by rivets 31. The rivets provide a predetermined amount of friction to the bar 29 for the purpose of having it retained in adjusted position when released from the seat. From Figs. 2 and 3 it will be noted that the track element 12 carries a bracket 32 which is U shape, with the outward portion having sloping surfaces 33 and a slot 34 disposed therebetween. The slide bar 29 has an upwardly extending flange 35 to which a solenoid 36 is secured. The armature 37 of the solenoid carries a finger 38 which, when extending within the slot 34, causes the slide bar 29 to move with the seat when the seat is adjusted. Upon the forward movement of the seat when the back is tilted forwardly, the slide bar is released and retained in adjusted position so that upon the return of the seat it will be stopped at the point of original adjustment. Thus, when the seat has been adjusted by the driver, the point of adjustment will not be changed each time the seat is shifted forwardly to increase the width of the access opening in the rear thereof.

A switch 41 is mounted on the rear of the bracket 11 in position to be operated to contact open position when moved against a stop element 42 threaded into one of a plurality of apertures 40 provided in the floor-engaging bracket 15. By shifting the stop element 42 to a selected aperture 40, the degree of force and movement of the seat may be controlled. The forward end of the bracket 11 carries a switch 43 which has an extending finger 44 engageable with a plate 45 on the forward end of the slide bar 29 to move the contacts thereof to open position. Thus, when the seat is moved forwardly, the brackets 11 move forwardly and the switch 41 has its contacts open when the arm engages the stop 42. Upon the reverse movement of the frame, the contacts of the switch 43 are moved to open position when the finger 44 engages the plate 45 on the end of the slide bar 29, thereby interrupting the reverse movement of the seat at the point of adjustment.

Referring to the wiring diagram of Fig. 4, a switch 46 has its plunger 47 moved downwardly when the seat back is tilted forwardly. A circuit is completed through contacts 48 and 49 of the relay 27 to drive the motor 24 and move the seat frame forwardly. This is accomplished through the closed contact 55 of the switch 46, completing a circuit from the grounded battery 51 to the ground 54. When the contacts 55 of the switch 46 are moved to closed position, contacts 57 are closed and contacts 58 are open. The contacts 57 energize the solenoid 36 and its armature 37 is drawn upwardly along with the finger 38 which is disengaged from the slot 34 of the bracket 32. This permits the seat to move forwardly without carrying the slide bar 29 along therewith. At the end of the forward movement, the contacts of the switch 41 are opened and the circuit to the motor interrupted, stopping the forward movement of the seat frame. A switch 62 is provided in the vehicle body for completing a circuit to the courtesy light 64 when the door of the vehicle is opened. When the door is closed, the switch 62 is opened, thereby interrupting the circuits through the contacts 55, 57 and 58 of the switch 46. When so disconnected, the circuits through the contacts of the relay 27 are completed through the switch 25 to provide manual adjustment. Thus, the normal operation of the seat to adjusted forward and rearward positions may occur when the doors of the vehicle are closed and the contacts of the switch 62 are open. The automatic adjustment of the seat to forward position can occur only when the door is open, preventing such shifting while the car is in operation. After the seat is moved forwardly and the contacts of the switch 41 are open, the forward movement is stopped and the switch 66 has its contacts opened as its operating arm moves from the cam 70 to de-energize the solenoid 36 which permits the finger 38 to drop downwardly in position to move up the sloping surface 33 and drop in the slot 34 upon the reverse movement of the seat frame.

When the seat back is moved back to its original position, the plunger 47 moves upwardly, separating the contacts 55 and 57 and engaging the contacts 58. This will complete a circuit to the coil of the relay 27, closing the contacts 67 and 68 and opening the contacts 48 and 49, thereby reversing the direction of flow of current through the motor and the direction of its operation. The seat and brackets 11 are now moved to the rear, which movement continues until the contacts of the switch 43 are opened through the engagement of the arm 44 with the plate 45 on the forward end of the slide bar 29. The opening of the contacts of the switch 43 de-energizes the coil of the relay 27, and the opening of the contacts 67 and 68 disconnects the circuit through the motor 24. At the end of the return movement of the brackets 11, the contacts of the switch 41 and those of the switch 66 are closed, while the contacts of the switch 43 remain in open position. Thus, by the use of a simple mechanism and control circuit, the motor operated seat frame is moved forwardly when the seat back is tilted forwardly and returned to its initial position upon the raising of the back to its initial position. It is to be understood that the slide bar 29, the circuit, and other necessary elements may be applied to both of the brackets 11 and tracks at each side of the body so that the movement of either seat back to forward position will produce the adjustment of the seat as described above.

Referring more specifically to Figs. 5 and 6, a further form of the invention is illustrated, that wherein a finger 71 is substituted for the finger 38 illustrated in the construction of Fig. 2. While the finger 38 was operated by the solenoid 36, the finger 71 of Figs. 5 and 6 is provided on an arm 72 of a lever 73. The arm 72 is secured by a pivot 74 to the bracket 11 so as to be carried along with the frame when adjusted. A U-shaped bracket 75, which is similar to the bracket 32, is carried by the adjustable slide bar 29, with the notch 34 aligned with the finger 71. A spring 76 urges the arm 72 in a counterclockwise direction and the finger 71 into the slot 34. An upwardly extending arm 77 from the arm 72 is offset outwardly at 78 to be in position of engagement with the end 79 of an operating rod 81. An outwardly extending bracket 82 is carried by the bracket 11, having tongues 83 containing apertures in which the pivoted portion 84 of the rod is supported. The opposite end 85 of the rod 81 is disposed in position to be engaged by the arm 86 of the seat back adjacent to the pivot 87 thereof. When the seat back is tilted forwardly, the end 79 of the rod 81 is moved in a slot 88 in the bracket 11, moving the arm 77 rearwardly and rocking the arm 72 upwardly and moving the finger 71 out of the slot 34. During this forward tilting movement of the back, the plunger 47 of the switch 46 is moved downwardly to the position illustrated in Fig. 4, and the sequence of operation of the switches and relays for driving the motor, first in one direction of rotation and then in the other, for advancing the seat and returning it to its initial position, takes place. With this construction, the contacts 57 on the switch 46 are eliminated, along with the solenoid 36 and the switch 66. Fig. 5, therefore, illustrates mechanical means for locking the slide bar 29 to the brackets 11 when the seat is normally adjusted in place of the solenoid 36 of Fig. 2 employed for producing such latching operation. In either of the arrangements, when the seat back is tilted forwardly, the seat shifts forwardly automatically to increase the space between the rear of the seat and the rear pillar of the door opening and when the back is raised the seat moves back to its original adjusted position.

What is claimed is:

1. In a seat construction including supporting means, motor means for adjusting a seat forwardly and rearwardly, a slide bar adjustable forwardly and rearwardly with the seat, means carried by the seat for releasably locking the bar to the seat, means actuated by the forward movement of the seat back for unlocking the slide bar from the seat, and further means carried by the seat actuated by the back when moved forwardly for actuating said motor means and causing the seat to move forwardly leaving said slide bar in a position for regulating the degree of reverse movement of the seat.

2. In a seat construction including supporting means, motor means for adjusting a seat forwardly and rearwardly, a slide bar adjustable forwardly and rearwardly with the seat, means carried by the seat for releasably locking the bar to the seat, means actuated by the forward movement of the seat back for unlocking the slide bar from the seat, further means carried by the seat actuated by the back when moved forwardly for actuating said motor means and causing the seat to move forwardly, means reversing the actuation of said motor means for causing said seat to move backwardly, and means on said slide bar for stopping the backward movement of the seat at its initial position when the back is returned to seating position.

3. The combination in a seat and back structure, track means on which the seat is supported for forward and rearward movement, a slide bar carried by said track means, operable means carried between said track means and slide bar for locking said slide bar for movement with the seat, means actuated by the forward tilting of the seat back for causing said operable means to release said slide bar permitting the slide to remain in adjusted position when the seat moves forwardly, and means on the slide bar and the seat for interrupting the reverse movement of the seat upon movement of the back to seating position for stopping the seat at the point of adjustment.

4. The combination as recited in claim 3 wherein the operable means is a solenoid.

5. The combination as recited in claim 3 wherein the operable means is a lever.

6. In a seat and back construction, track means having a stationary portion and a movable portion carried thereby, a seat supporting bracket carried by said movable portion, a slide bar carried by said stationary portion, and releasable locking means supported between said movable portion and slide bar for locking said movable portion and bar for combined movement.

7. In a seat and back construction, track means having a stationary portion and a movable portion carried thereby, a seat supporting bracket carried by said movable portion, a slide bar carried by said stationary portion, releasable locking means supported between said movable portion and slide bar for locking said movable portion and bar for combined movement, a seat carried by said track means, a pivoted back carried by said seat, and means operated by the movement of said pivoted back forwardly to disengage said locking means and permit said seat to move independently of the adjusted position of said slide bar.

8. In a seat and back construction, track means having a stationary portion and a movable portion carried thereby, a seat supporting bracket carried by said movable portion, a slide bar carried by said stationary portion, releasable locking means supported between said movable portion and slide bar for locking said movable portion and bar for combined movement, a seat carried by said track means, a pivoted back carried by said seat, means operated by the movement of said pivoted back forwardly to disengage said locking means and permit said seat to move independently of the adjusted position of said slide bar, and means carried by said slide bar and the seat for securing the interruption of the return movement of the seat to its original adjusted position upon the return of the back to its initial position.

9. In a vehicle body having a door, a seat in said body adjacent to said door having a movable back thereon, track means having a stationary portion and a movable portion supporting said seat, a slide bar on one of said portions, means on the other portion for releasably locking the bar to the seat to have the bar move with the seat to an adjusted position, and means actuated by the movement of the back relative to the seat for unlocking the slide bar from the seat and for causing the seat to move forwardly from adjusted position independently of the slide bar.

10. In a vehicle body having a door, a seat in said body adjacent to said door having a movable back thereon, track means having a stationary portion and a movable portion supporting said seat, a slide bar on one of said portions, means on the other portion for releasably locking the bar to the seat to have the bar move with the seat to an adjusted position, means actuated by the movement of the back relative to the seat for unlocking the slide bar from the seat and for causing the seat to move forwardly from adjusted position independently of the slide bar, and means actuated upon the movement of the back to its initial position for returning the seat to the adjusted position of said slide bar and locking the slide bar thereto.

11. In a vehicle body having a door, a seat in said body adjacent to said door having a movable back thereon, track means having a stationary portion and a movable portion supporting said seat, a slide bar on one of said portions, means on the other portion for releasably locking the bar to the seat to have the bar move with the seat to an adjusted position, means actuated by the movement of the back relative to the seat for unlocking the slide bar from the seat and for causing the seat to move forwardly from adjusted position independently of the slide bar, and means interrelated with said actuated means and operated upon the closing of the door for rendering said actuated means unresponsive to the movement of the back.

12. In a vehicle body having a door, a seat in said body adjacent to said door having a movable back thereon, track means having a stationary portion and a movable portion supporting said seat, a slide bar on one of said portions, means on the other portion for releasably locking the bar to the seat to have the bar move with the seat to an adjusted position, means actuated by the movement of the back relative to the seat for unlocking the slide bar from the seat and for causing the seat to move forwardly from adjusted position independently of the slide bar, and adjustable means between the stationary and movable portions regulating the amount of forward movement occurring to the seat when the back is moved.

References Cited in the file of this patent

UNITED STATES PATENTS

| | | |
|---|---|---|
| 2,160,015 | Haberstump | May 30, 1939 |
| 2,189,396 | Greig | Feb. 6, 1940 |
| 2,624,613 | Parmely | Jan. 6, 1953 |
| 2,660,223 | Appleton | Nov. 24, 1953 |